(12) United States Patent
Fenger

(10) Patent No.: US 12,116,248 B2
(45) Date of Patent: Oct. 15, 2024

(54) CRANE SYSTEM FOR HOISTING OF WIND TURBINE COMPONENTS

(71) Applicant: LIFTRA IP APS, Aalborg SV (DK)

(72) Inventor: Per Fenger, Terndrup (DK)

(73) Assignee: LIFTRA IP APS, Aalsborg SV (DK)

( * ) Notice: Subject to any disclaimer, the term of this patent is extended or adjusted under 35 U.S.C. 154(b) by 406 days.

(21) Appl. No.: 17/494,666

(22) PCT Filed: Feb. 11, 2020

(86) PCT No.: PCT/DK2020/050035
§ 371 (c)(1),
(2) Date: Oct. 5, 2021

(87) PCT Pub. No.: WO2020/177824
PCT Pub. Date: Sep. 10, 2020

(65) Prior Publication Data
US 2023/0303366 A1    Sep. 28, 2023

(30) Foreign Application Priority Data

Mar. 1, 2019   (DK) ............................. PA201970143

(51) Int. Cl.
*B66C 23/00* (2006.01)
*B66C 1/10* (2006.01)
(Continued)

(52) U.S. Cl.
CPC ............ *B66C 23/207* (2013.01); *B66C 1/108* (2013.01); *F03D 13/10* (2016.05); *F03D 80/50* (2016.05); *F05B 2230/61* (2013.01)

(58) Field of Classification Search
CPC ............ B66C 1/108; B66C 1/34; B66C 13/04; B66C 13/06; B66C 13/08; B66C 23/02;
(Continued)

(56) References Cited

U.S. PATENT DOCUMENTS

| 2011/0094987 A1* | 4/2011 | Botwright | .............. B66C 23/62 |
| | | | 212/270 |
| 2015/0232307 A1* | 8/2015 | Holloway | .............. B66C 13/08 |
| | | | 254/338 |

(Continued)

FOREIGN PATENT DOCUMENTS

| CN | 101654211 A | 3/2016 |
| DE | 102004056340 A1 | 5/2006 |

(Continued)

OTHER PUBLICATIONS

Danish Patent and Trademark Office; Search Report; Application No. PA 2019 70143; Date of completion of the search report Aug. 29, 2019; 1 page.

*Primary Examiner* — Emmanuel M Marcelo
(74) *Attorney, Agent, or Firm* — Holland & Hart LLP

(57) ABSTRACT

A crane system for moving a burden, such as a wind turbine component, between the nacelle or rotor of a wind turbine and a location at a lower end of the wind turbine at a distance from the wind turbine, wherein the crane system includes a crane, said crane being adapted to be mounted near or in the nacelle of the wind turbine, wherein said crane includes a boom and wherein the crane has at least one rotational axis, about which sections of the crane can rotate. The disclosure further relates to a method for moving a burden, such as a wind turbine component, between the nacelle or rotor of a wind turbine and a location at a lower end of the wind turbine at a distance from the wind turbine.

20 Claims, 12 Drawing Sheets

(51) Int. Cl.
*B66C 23/20* (2006.01)
*F03D 13/10* (2016.01)
*F03D 80/50* (2016.01)

(58) Field of Classification Search
CPC ..... B66C 23/16; B66C 23/185; B66C 23/207;
F03D 13/10; F03D 13/40; F03D 80/50
See application file for complete search history.

(56) References Cited

U.S. PATENT DOCUMENTS

| | | | |
|---|---|---|---|
| 2015/0300175 A1 | 10/2015 | Pfeiffer et al. | |
| 2017/0067447 A1* | 3/2017 | Reynolds | ................ F03D 13/10 |

FOREIGN PATENT DOCUMENTS

| | | | | |
|---|---|---|---|---|
| EP | 1239150 A2 | 9/2002 | | |
| EP | 2147885 A1 | 1/2010 | | |
| EP | 3026263 A1 | 6/2016 | | |
| EP | 3246561 A1 | 11/2017 | | |
| EP | 3312415 A1 | 4/2018 | | |
| GB | 2558242 A | 7/2018 | | |
| JP | 2009002206 A * | 1/2009 | ............ | B66C 1/108 |
| KR | 101 068 229 B1 | 9/2011 | | |
| WO | WO-2006053554 A2 * | 5/2006 | ............ | F03D 1/001 |
| WO | WO 2011/050812 A1 | 5/2011 | | |
| WO | WO 2018/054440 A1 | 3/2018 | | |
| WO | WO-2020053389 A1 * | 3/2020 | ............ | B66C 1/108 |
| WO | WO 2020135906 A1 | 7/2020 | | |
| WO | WO-2022043272 A1 * | 3/2022 | ........... | F03D 1/0658 |

* cited by examiner

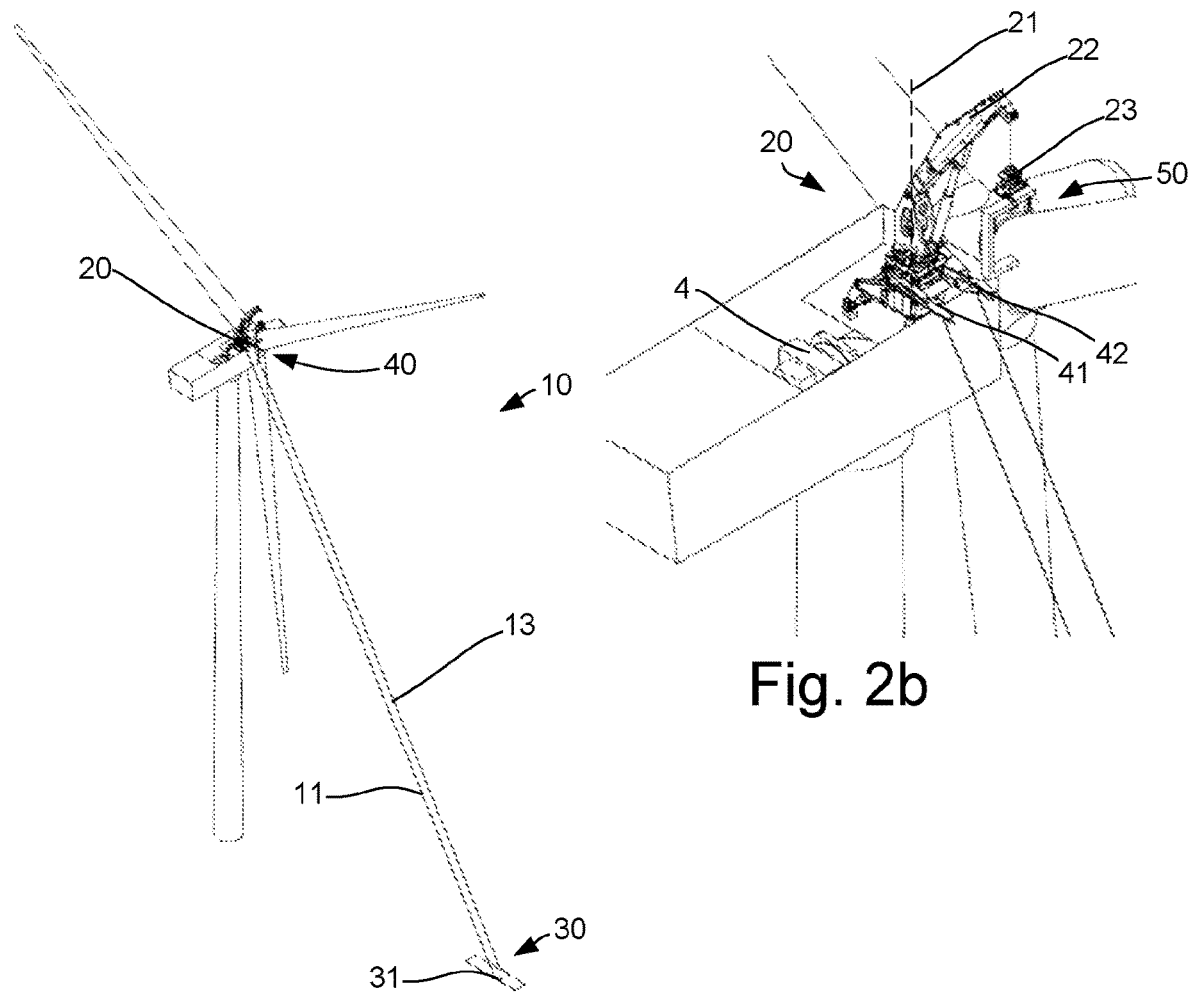
Fig. 2a
Fig. 2b
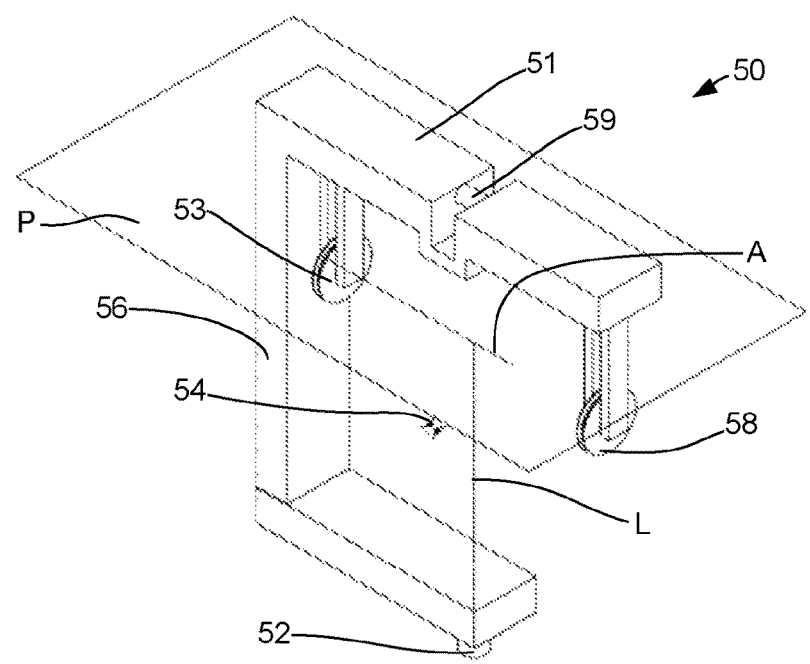
Fig. 2c

CRANE SYSTEM FOR HOISTING OF WIND TURBINE COMPONENTS

CROSS-REFERENCE

The present application is the national phase entry under 35 U.S.C. 371 of International Patent Application No. PCT/DK2020/050035 by Finger, entitled "CRANE SYSTEM FOR HOISTING OF WIND TURBINE COMPONENTS," filed Feb. 11, 2020, and claims the benefit of Danish Patent Application No. PA201970143 by Fenger, entitled "CRANE SYSTEM FOR HOISTING OF WIND TURBINE COMPONENTS," filed Mar. 1, 2019, each of which is assigned to the assignee hereof, and each of which is expressly incorporated by reference in its entirety herein.

TECHNICAL FIELD

The present disclosure relates to a crane system for moving a burden, such as a wind turbine component, between a location near the top of a wind turbine and a location at a lower end of the wind turbine at a distance from the wind turbine, wherein the crane system comprises a crane, said crane being adapted to be mounted near or in the nacelle of the wind turbine, wherein said crane comprises a boom and wherein the crane has at least one rotational axis, about which sections of the crane can rotate.

The present disclosure further relates to a method for moving a burden, such as a wind turbine component, between the nacelle or rotor of a wind turbine and a location at a lower end of wind turbine at a distance from the wind turbine

BACKGROUND

Larger tower or mobile cranes that are built up next to the wind turbine have been known to hoist components in a wind turbine system. They are, however, very large, as they are placed on the ground and are built to a height where they can remove the components from the wind turbine. These cranes have a large reach outside of the wind turbine, due to the fact that they are placed on the ground outside of the wind turbine and due to the fact that they are very large in size.

Crane systems, which are mounted in a wind turbine have also been known to hoist components in a wind turbine system. An example of a crane of this type is CA3012945A1. The main advantage of cranes of this type is that they are small in size, compared to traditional cranes used in the wind turbine service industry. However, these cranes are only able to lower the burden straight down, such that the burden will be placed substantially below the tip of the crane boom, said tip of the crane boom due to their small size has a limited reach.

These types of cranes are therefore limited by their reach, when the burden cannot be placed directly below the tip of the crane. Such cases could be when a small lake is placed next to the wind turbine, or the wind turbine is located on uneven ground, where placing a truck or other component handling equipment right next to the wind turbine is difficult or impossible.

Cable cranes are known to move burdens along a horizontal path, wherein a winch located at the top of a structure and pulls a cart on a cable from one structure to another. This system is used for construction of bridges crossing a mountain chasm, or other similar structures, where horizontal movement of loads on the ground is limited or impossible. However, these cranes are limited in that they can only move the load in a straight line. Further they are limited in that the cable and winch must always be located higher than the intended drop zones of the burden and there cannot be any obstacles or structures between the intended drop zones at each end of the cable way. A drop zone is defined as the location a location at a lower end of the wind turbine, where the burden is intended to be release from the crane system. As such, their use in wind turbine service and repair work is very limited, since there are no support structures above the nacelle, and as such, no clear line of movement between drop zones. Further, the same cables crane cannot be used to move components placed at different locations in the wind turbine, as the cable crane is a static structure. As such cable cranes have not gained high usage in the wind turbine industry, where a low height and large flexibility in use is required.

While the large mobile or tower cranes have functioned very well over a long time, they are becoming less usable, as wind turbines are increasing in height. As such, the smaller wind turbine mounted cranes are becoming more advantageous, as the size of the crane becomes independent on the height of the wind turbine tower. However, an issue arises when the burden cannot be placed close to the wind turbine.

SUMMARY

It is an objective of the present disclosure to provide a crane system, by which it is possible to improve the problems of the prior art.

In a first aspect of the disclosure, these and further objects are obtained by a crane system of the kind mentioned in the introduction, which is further characterized in that the crane system comprises a lower cable support system adapted to be arranged at a lower end of the wind turbine at a distance from the wind turbine, an upper cable support system adapted to be mounted on the wind turbine at a height higher than the lower cable support system, a first cable adapted to be extended between the upper cable support system and the lower cable support system, and wherein the crane system further comprises a load carrying device, said load carrying devices, comprising a first structural section, a first linkage, wherein said first structural section comprises at least a first roller adapted to roll on the first cable, and wherein the first linkage is provided with means to connect the load carrying device to the burden.

There are several advantages for using a crane system of this type, as the burden can be moved both in a vertical and horizontal direction, while the crane operates as a normal boom crane. This is in particular an advantage, when the ground below the wind turbine is uneven, inaccessible or for off-shore application.

By having a load carrying device of this type, it is possible to use the crane in all of its range, while also being able to move the burden in a horizontal direction. Further it is an advantage that the burden does not need to be re-rigged during the operation of hoisting a burden from the nacelle to the ground, or vice versa. This is an advantage as it is generally unsafe to re-rig burdens at the top of a wind turbine, as dropping burdens from heights of more than 100 meters is considered a high risk. It is therefore in the industry largely to be avoided.

In an example of the disclosure, one of the at least one rotational axis is a vertical axis. This is advantageous when using a standard yaw crane, as most yaw cranes are made to yaw about a substantially vertical axis.

By having a boom crane, which can yaw about an axis, which is mounted near or in the nacelle of the wind turbine, the crane system becomes diverse in its operational functions, as it can reach most of the components inside the wind turbine, in order to install, replace or move the components.

In another example of the disclosure, one of the at least one rotational axis is a horizontal axis. This is advantageous when using a boom crane, which has an actuatable boom, such as a hydraulic boom crane. This is advantageous when lifting high loads, where a slew crane becomes to large and expensive to manufacture. As such, the burdens to be lifted can still be located at different heights and different longitudinal locations. For example, a crane of this type, mounted at the rear end of a wind turbine nacelle, can lift both a gear box, a main bearing or a rotor of a wind turbine, as these components will all be placed inline of each other.

In another example according to the disclosure the upper cable support system is located near or in the nacelle of the wind turbine.

This is advantageous as it is considerably easier to install the upper cable support system, when the installation location of said upper cable support system is reachable from the nacelle of the wind turbine.

In a further example according to the disclosure the upper cable support system is connected to a part of the crane.

This is an advantage when the crane is installed in or near the nacelle of the wind turbine, as an extra operation can be saved, if the upper cable support system is connected to a part of the crane, in an integrated manner, such that the upper cable support system is in fact installed at the same time as a part of the crane.

In yet another example according to the disclosure the upper cable support system comprises a pulley which is adapted to engage with the first cable, such that the first cable rolls in the pulley.

This is advantageous, if the first cable is used during installation of the crane, or if the first cable is connected to a further location, after being supported by the upper cable support system.

In another example according to the disclosure the crane system according to any of the previous examples is configured such that when the least a first roller adapted to roll on the first cable is engaged with the roller, the first linkage is located below the first cable.

This is advantageous because the center of mass of the burden will be below the first cable, which will stabilize the crane system. If the center of gravity of the burden and the load carrying device are placed above the first cable, the burden and load carrying device will act as a reverse pendulum having the first roller as a pivot. If, however, the combined center of mass of the load carrying device and the burden is below the first cable, the burden and load carrying device will act as a pendulum having the first roller as a pivot. Such a pendulum system is from a control point of view a stable system, if the crane system does not experience external loading, such as wind loads.

In an example according to the disclosure, the load carrying device has a roller plane defined as being parallel to the axis of rotation of the first roller, the roller plane is further defined as intersecting the first roller in at least one point, the roller plane is further defined as being perpendicular to a line extending between the first linkage and the axis of rotation of the first roller, said line being perpendicular to the axis of rotation of the first roller, and wherein the center of mass of the load carrying device is located on the side of the roller plane which is towards the first linkage.

This is an advantage, when no burden is connected to the first link, as the load carrying device will act as a pendulum and the center of mass will remain below the first cable, resulting in a stable movement of the load carrying device.

In another example according to the disclosure the first linkage comprises an extendable section, which can vary in length, such as a cylinder, a lead screw, a chain hoist or other suitable alternatives.

This is advantageous when large volume burdens are to be lifted, since the lifting height of the crane above the nacelle is often limited. Having an extendable section allows the first linkage to have a retracted configuration and an extended configuration. Therefore, when lifting a burden from the nacelle of the wind turbine the first linkage is in its retracted configuration, such that the lifting height above the nacelle can be maximized. As such larger components can be lifted above the walls of the nacelle or the nacelle cover, without conflicting with the nacelle. When the burden is outside the nacelle, the first linkage is extended to its extended configuration, such that the burden hangs at a greater distance below the first structural section, than if the first linkage was in its retracted configuration. This is an advantage, when lifting large burdens, which could otherwise come into contact with the first cable.

In another example according to the disclosure the load carrying device further comprises a second structural section, said second structural section connecting the first structural section and the first link.

This ensures that the first structural section can be above the first cable, while the first linkage is below the first cable.

In a further example, the second structural section is located to a side of the load carrying device, such that there is a distance between the second structural section and a center line between the point where the hook of the crane attaches to the load carrying device and the point where the first linkage connects to the burden to be carried.

In an even further example, the first cable is located between the second structural section and the center line between the point where the hook of the crane attaches to the load carrying device and the point where the first linkage connects to the burden to be carried.

In yet another example according to the disclosure the load carrying device further comprises a second structural section, said second structural section connecting the first structural section and the first linkage, wherein said second structural section comprises an extendable portion, which can vary in length.

This is advantageous when the first cable is mounted at a small angle with respect to the vertical direction. In an example of the disclosure a small angle of the first cable with respect to the vertical direction is an angle less than 45 degrees. In an example, the angle is less than 30 degrees, and in another example, the angle is below 22.5 degrees with respect to the vertical direction. The angle will generally become smaller, when either the height of the wind turbine tower increases, if the upper cable support system is located in or near the nacelle, or when the location of the lower cable support system is moved closer to the wind turbine tower. Having an extendable section allows the second structural section to have a retracted configuration and an extended configuration. As such a crane system of the type wherein the load carrying device comprises a second structural section comprising an extendable portion is advantageous both when the height of the upper cable support system is increased and when the lower cable support system is required to be moved close to the wind turbine tower. Since the lifting height of the crane above the nacelle is often limited, it is, in these situations advantageous when lifting a burden from the nacelle of the wind turbine that the second structural section is in its retracted configuration, such that the lifting height above the nacelle can be maximized. When the burden is lifted above the walls of the nacelle or the nacelle cover and outside of the nacelle, without conflicting with the nacelle, the second structural section is extended to its extended configuration, such that the first linkage hangs at a greater distance below the first structural section, than if the second structural section was in its retracted configuration. Thus, it is possible to avoid a part of the load carrying device, below the first roller from coming into contact with the first cable.

In a further example of the disclosure the extendable portion of the second structural section is a cylinder, a lead screw, a chain hoist or other suitable alternatives.

In yet another example of the disclosure, the crane system comprises a tensioning device, said tensioning device being capable of adjusting the tension in the first cable.

There are several advantages to this. The tension in the first cable is of high importance of where the burden will land on the surface near the bottom of the wind turbine. The higher the tension is in the first cable, the closer to the lower cable support system the burden will land on the surface. It is therefore an advantage to be able to vary the tension in the first cable, such that the desired location on the surface near the bottom of the wind turbine can be reached by the burden. This is highly advantageous when the burden is to be placed precisely on a bed of a truck or a ship for off-shore application.

In an example of the disclosure, the lower cable support system comprises the tensioning device.

This is advantageous as the lower cable support system is often more accessible than the upper cable support system.

In an another example, the tensioning device is a winch. As such, by having a predetermined length of cable on the winch, the same crane system can be used for a large range of wind turbine heights or horizontal distances between the wind turbine and the lower cable support system.

In an example of the inventive concept, the crane system comprises a lower cable support system, wherein the lower cable support system comprises a tensioning device in the form of a winch, said winch being configured to adjust the tension in the first cable by rotation in a first or second direction, wherein the first cable is connected to the crane at a first end of the first cable, and wherein the upper cable support system is between the first end of the first cable and the lower cable support system.

In another example, the part of the crane that the first end of the first cable is connected to is a crane hook assembly, wherein the crane hook assembly comprises at least a crane hook.

In another example, the part of the crane that the first end of the first cable is connected to is the crane boom, and wherein the first cable at at least one point between the upper cable support system and the first end of the first cable is in contact with a pulley, wherein said pulley is comprised in the crane hook assembly.

This is an advantage, when the crane is of a type where the crane hook is operated by winches placed at a location at a lower end of the wind turbine at a distance from the wind turbine. As such, the first cable can be used both to lower and raise the hook of the crane as well as to support the load carrying device and facilitate the horizontal movement of the burden between the upper cable support system and the lower cable support system.

In a further example the first roller of the first structural section is adapted to roll on a length of the first cable between the upper cable support system and the lower cable support system, such that the load carrying device can be hoisted up or down, by rotating the winch either in a first direction or a second direction.

In yet another example according to any of the previously described examples the crane system further comprises a second cable, wherein the first and second cables are independently connected to the upper cable support system and the lower cable support system and wherein the load carrying device comprises a second roller, and wherein the first and second rollers are adapted to roll on the first and second cable respectively.

This is advantageous as the crane system is further stabilized by having two cables on which the load carrying device can be rolled on. As such, the load will be more restricted to rotate about an axis parallel to the first cable. When only having one cable, the load carrying device and the burden will act as a pendulum, which will swing below the first cable. While this oscillation is technically stable, it is still preferred to have less unwanted movement of the burden. By having a second cable and a second roller configured to roll upon the second cable, it is possible to add further support to the system.

In a further example of the disclosure, the second roller is attached to the first structural section.

In another example according to the disclosure, a first plane is defined by a first line, said first line extending from a point of the upper cable support system which is in contact with the first cable and a point of the lower cable support system which is in contact with the first cable, and the vertical direction and a second plane is defined by a second line, said second line extending from a point of the upper cable support system which is in contact with the second cable and a point of the lower cable support system which is in contact with the second cable, and the vertical direction, and wherein the load carrying device is arranged, such that when the first and second roller are in contact with the first and second cables, the first linkage is located in a position between the first and second planes.

When the first linkage is located in a position between the first and second planes, and the burden is hanging below the first link, the crane system will behave in a very stable manner. As long as the combined center of mass of the load carrying device and the burden is between the two planes, there will be a downwards load from the first and second roller onto the first and second cable, respectively. Therefore, the load carrying device and burden will move in a very stable and controlled manner. If the combined center of mass of the load carrying device and the burden is above the first and second cables, it would however be very sensitive to external loading such as wind gusts and could risk falling off of the first and second cables. If the combined center of mass of the load carrying device and the burden is below the first and second cables, it will be much more stable, and much less sensitive to external loading, as it will return to the stable configuration after experiencing for example a wind gust.

In an example according to the disclosure, the length of the first cable, which is between the upper cable support system and the lower cable support system, and the length of the second cable, which is between the upper cable support system and the lower cable support system, are substantially parallel to each other.

This is advantageous as the crane system is easier to operate, as the first and second roller can be configured on a parallel axis, which allows for a more controlled operation.

In another example of the inventive concept, the load carrying device comprises an attachment point, which is formed, such that normal crane hook can attach to it. The attachment point could be a lifting eyelet, a shackle, a bolt or other similar means to connect to a crane hook. This is advantageous as the load carrying device can be provided as a lifting yoke, and as such some prior art cranes can be converted to a crane system according to the disclosure, by provided the rest of the elements and a lifting yoke of this type.

In yet another example according to the inventive concept, the crane system comprises a secondary tensioning device, wherein said secondary tensioning device is located between the upper cable support system and the lower cable support system at a location near the upper cable support system, and wherein the secondary tensioning device, when retracting to increase the tension, changes the angle and position of the first cable, by pulling the first cable towards the tower of the wind turbine. This is advantageous, when the size of the burden is large, and would otherwise come into contact with the first cable, when the load carrying device is placed on the first cable. By pulling the cable towards the tower of the wind turbine, the angle between the horizontal plane and the length of the first cable between the lower cable support system and the secondary tensioning device is decreased, thus allowing for a larger burden.

In yet another example of the disclosure, the load carrying device comprises a locking device, which is configured to lock the first roller in rollable contact with the first cable and/or lock the second roller in rollable contact with the second cable. When the locking device is active and it has securely locked at least the first roller in rollable contact with the first cable, the load carrying device will not be able to disengage from the first cable, until the locking device has been deactivated. This is advantageous, as the safety of the system is highly increase. The locking device could be a pin, which is either manually, remotely or automatically actuated between an active position or an inactive position. Another example of a locking device is a secondary roller, which is actuated into a position under the first cable, when the first roller is rollably engaged above the first cable, wherein the secondary roller of the locking device is positioned such that the distance between the closest parts of the first roller and the secondary roller is less than the diameter of the first cable.

A second aspect of the inventive concept, relates to a method for moving a burden, such as a wind turbine component, between the nacelle or rotor of a wind turbine and a location at a lower end of the wind turbine at a distance from the wind turbine, wherein the method comprises connecting a first cable between a lower cable support system, adapted to be arranged at a lower end of the wind turbine at a distance from the wind turbine and an upper cable support system, adapted to be mounted on the wind turbine at a height higher than the lower cable support system, connecting a burden, such as a transformer, to a load carrying device comprising a first structural section and a first linkage, wherein the burden is detachably attached to the first linkage and wherein the first structural section comprises a first roller, lifting the burden, using a crane mounted near or in the nacelle of the wind turbine, placing the first structural section of the load carrying device on the first cable, such that the first roller connects to the first cable in a rollable manner, hoisting the burden up or down using the crane, while the load carrying device is guided by the first cable.

In an example according to the second aspect of the inventive concept, the method further comprises yawing the crane about a substantially vertical axis and hoisting the burden between a position attached to the wind turbine inside the nacelle and a free position outside of the nacelle hanging from the first linkage.

In another example according to the second aspect of the inventive concept, the method further comprises connecting a second cable between the lower cable support system, adapted to be arranged at a lower end of the wind turbine at a distance from the wind turbine and the upper cable support system, adapted to be mounted on the wind turbine at a height higher than the lower cable support system, and 3) placing the first structural section of the load carrying device on the first and second cables, such that the first roller and a second roller connect to the first and second cables, respectively, in a rollable manner.

In yet another example according to the second aspect of the inventive concept, the method further comprises extending an extendable portion of the first linkage, such that the first linkage switches between a retracted configuration and an extended configuration.

In yet another example according to the second aspect of the inventive concept, the method further comprises extending an extendable portion of a second structural part of the load carrying device, such that the second structural section switches between a retracted configuration and an extended configuration.

BRIEF DESCRIPTION OF THE DRAWINGS

The disclosure will be described in more detail below by means of non-limiting examples and with reference to the schematic drawings.

FIG. 2a shows a perspective view of an example in accordance with the disclosure;

FIG. 2b shows a detailed perspective view of FIG. 2a;

FIG. 2c shows a detailed perspective view the load carrying device in accordance with the disclosure;

FIG. 5b shows a side view the embodiment of FIG. 5a;

FIG. 6b shows a side view of FIG. 6a;

DETAILED DESCRIPTION

Figure 1:
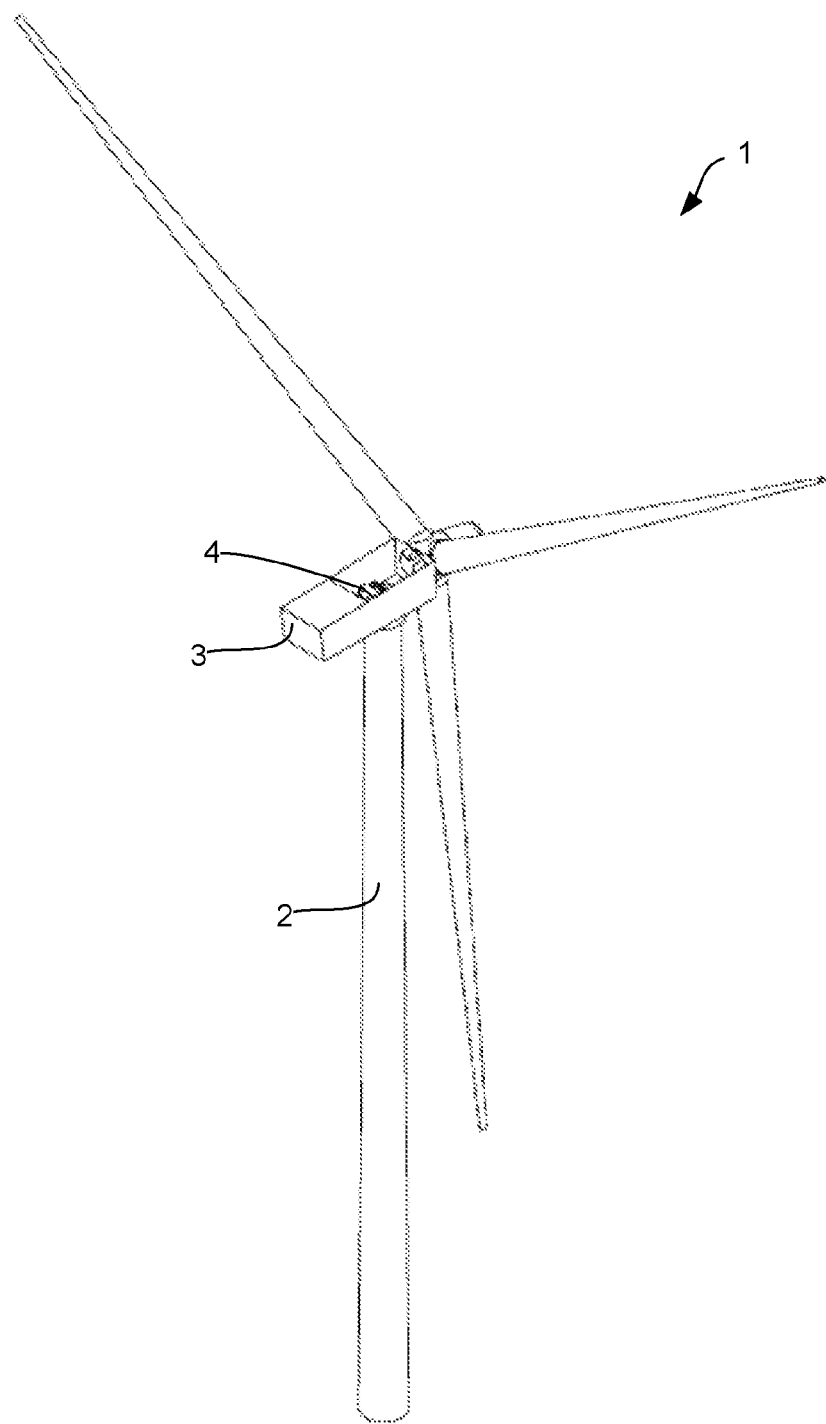
FIG. 1 shows a perspective view of a wind turbine in accordance with the disclosure.

FIG. 1 shows a perspective view of a wind turbine 1 according to the state of the art. Such a wind turbine comprises a tower 2, a nacelle 3 and a number of components 4 inside the nacelle 3. The height of the tower 2 is generally increasing as the wind turbine manufacturers are building larger and larger wind turbines 1.

FIG. 2a shows a crane system 10 according to an example of the disclosure, wherein a crane 20 is mounted in the nacelle 3 of the wind turbine 1. The crane system 10 further comprises a lower cable support system 30 located at a lower end of the wind turbine 1 and at a distance from the wind turbine 1 and an upper cable support system 40 located near the nacelle 3. The crane system 10 further comprises a first cable 11 and a second cable 13.

FIG. 2b shows a detailed view of FIG. 2a, where the crane system 10 is shown in greater detail. The crane 20 is shown comprising a yaw axis 21, about which a part of the crane can slew. Further a crane boom 22 is shown, which when the crane 20 slews about the yaw axis 21, will be able to reach components 4 inside the nacelle 3, while also being able to lower the component 4 outside the nacelle 3. The crane 20 further comprises a crane hook 23, which in this example is connected to a load carrying device 50. In this example the upper cable support system 40 comprises a first pulley 41 and a second pulley 42, said first and second pulley 41, 42 being connected to the first and second cable 11, 13 respectively. In this example, the first and second cables 11, 13 are further connected to the crane boom 22 and at the first end of the first and second cables 11, 13 they are connected to the crane hook 23.

FIG. 2c shows a detailed view of the load carrying device 50, wherein the load carrying device 50 comprises a first structural section 51, said first structural section 51 comprising means for connecting to the crane 20, such as a hook point 59 to attach to the crane hook 23. The first structural section 51 further comprises a first roller and a second roller 58, which are adapted to roll on the first and second cable 11, 13. The load carrying device 50 further comprises a second structural section 56, and a first linkage 52, wherein the first linkage 52 is adapted to attach to a burden, such as a wind turbine component 4. The load carrying device 50 further comprises a roller plane P defined as being parallel to the axis of rotation A of the first roller 53, the roller plane P is further defined as intersecting the first roller 53 in at least one point, the roller plane P is further defined as being perpendicular to a line L extending between the first linkage 52 and the axis of rotation A of the first roller 53, said line L being perpendicular to the axis of rotation A of the first roller 53, and wherein the center of mass 54 of the load carrying device 50 is located on the side of the roller plane P which is towards the first linkage 52. In this example of the disclosure, the second structural section 56 is substantially parallel to the line L.

Figure 3A:
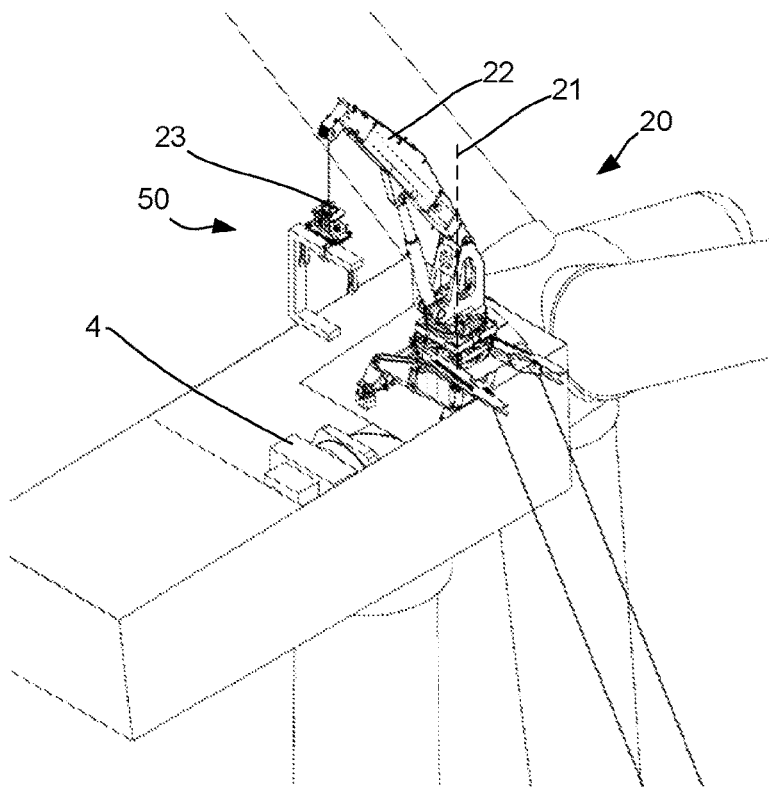
FIG. 3a shows a detailed perspective view of a crane slewing over the nacelle of a wind turbine in accordance with the disclosure.

FIG. 3a show a detailed view of the crane system 10 wherein the crane 20 has rotated about the yaw axis 21 in order to lift a component 4 of the wind turbine, such as a generator or a gearbox, using the load carrying device 50.

Figure 3B:
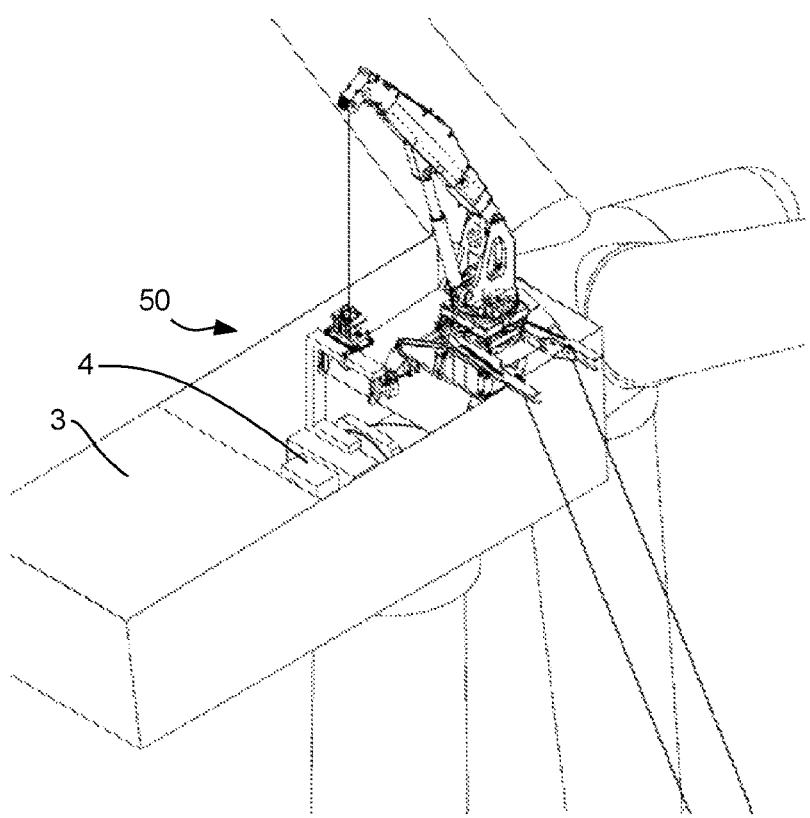
FIG. 3b shows a detailed perspective view of a crane attaching a load carrying device to a burden in the nacelle of a wind turbine in accordance with the disclosure.

FIG. 3b show a detailed view of the crane system 10 wherein the crane 20 has lowered the load carrying device 50 and has attached the first linkage 52 to the component 4 inside the nacelle 3. Once the load carrying device 50 is connected to the component 4 and disconnected from the wind turbine 1, the crane 20 can raise the load carrying device 50 either by winching the cable in or by using a crane boom 22 cylinder.

Figure 4A:
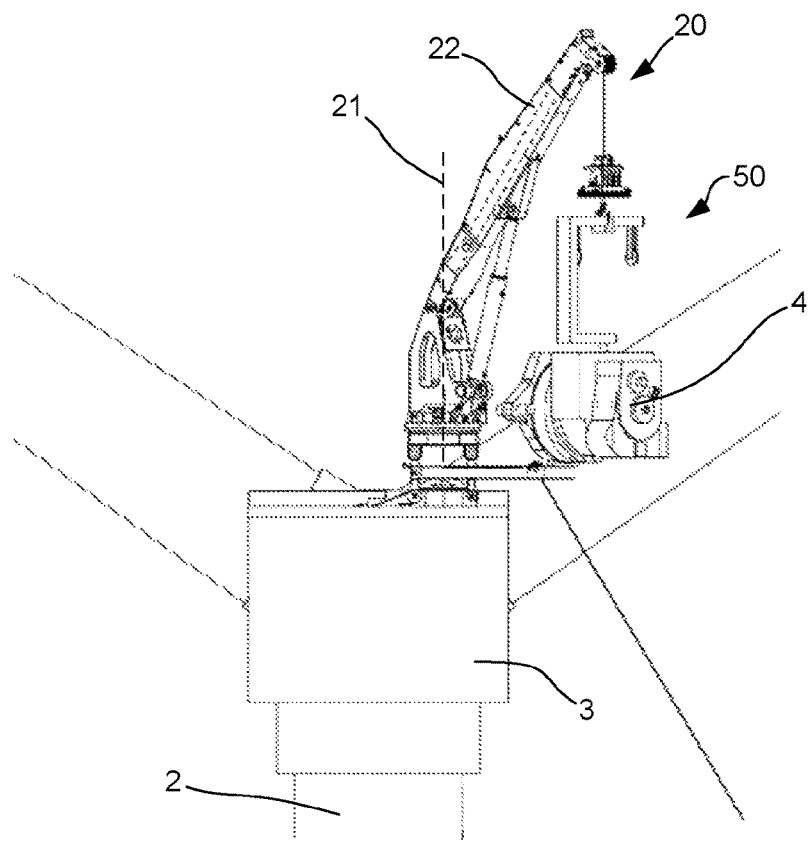
FIG. 4a shows a detailed perspective view of a crane slewing a burden over the walls of the nacelle of a wind turbine in accordance with the disclosure.

FIG. 4a show a side view of the crane system 10 wherein the crane 20 has rotated about the yaw axis 21 in order to lift the component 4 of the wind turbine outside the nacelle 3 of the wind turbine 1.

Figure 4B:
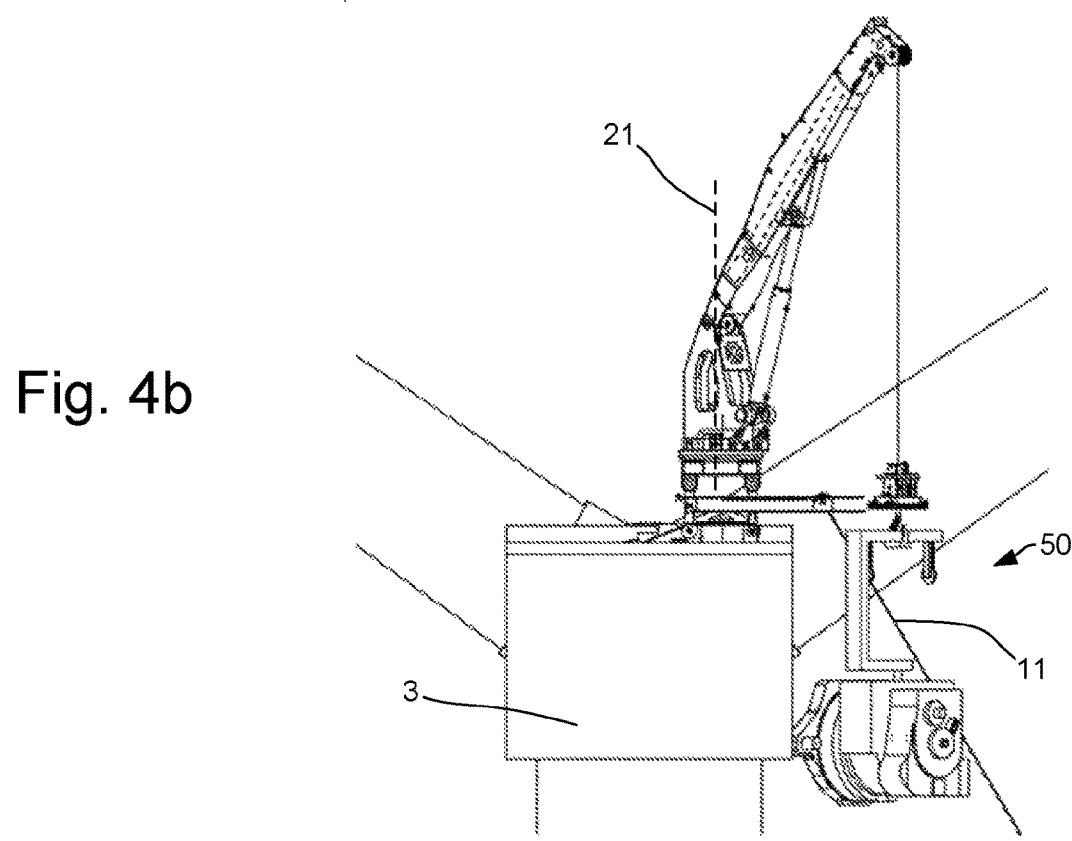
FIG. 4b shows a detailed perspective view of a crane lowering a burden in accordance with the disclosure.

FIG. 4b show a side view of the crane system 10 wherein the crane 20 has lowered the load carrying device 50 and the component 4 outside the nacelle 3, and positioning the load carrying device 50 for engagement with the first cable 11.

Figure 5A:
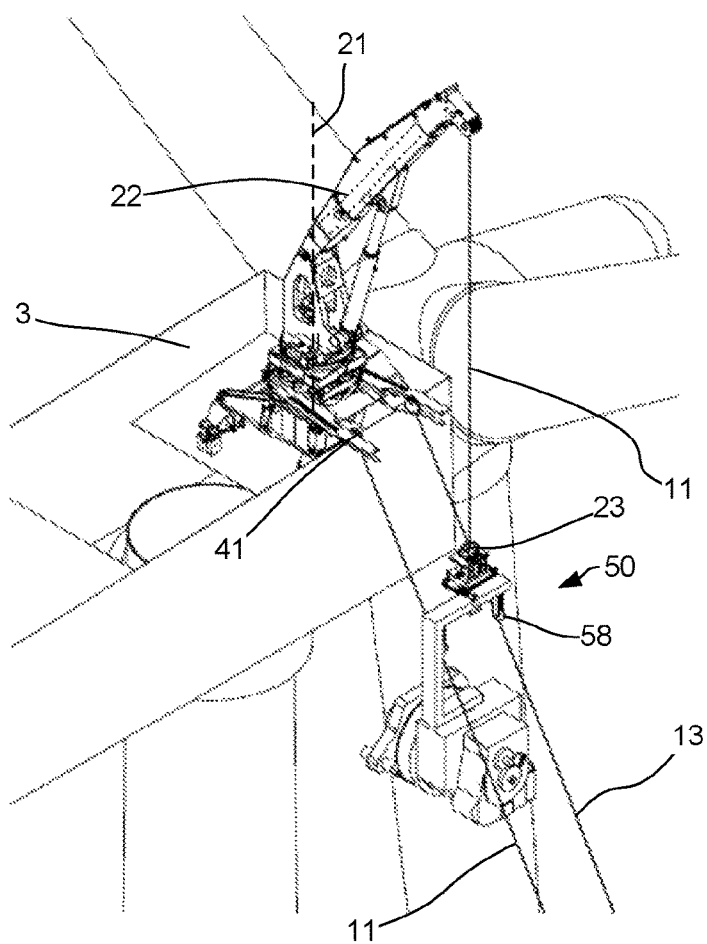
FIG. 5a shows a perspective view of a crane system positioning a load carrying device in relation to a first and second cable in accordance with the disclosure.

FIG. 5a show a side view of the crane system 10 wherein the crane 20 has positioned the load carrying device 50 in a position such that the first roller 53 is in rollable contact with the first cable 11 on a length of the first cable 11 between the upper cable support system 40 and the lower cable support system 30, and wherein the second roller 58 is in rollable contact with the second cable 13. It is further seen in FIG. 5a, that the first cable 11 is redirected over the first pulley 41 and a number of subsequent pulleys, such that the first cable exits the crane boom 22 at the tip of the boom and is connected to the crane hook 23 at the first end 12 of the first cable 11. At the other end, the first cable 11 is connected to a tensioning device 31 in the form of a winch, said tensioning device 31 being comprised in the lower cable support system 30. Therefore, in the example shown in FIG. 5a, when the winch 31 is rotated in a first direction, the first cable 11 is wound tighter on the winch 31 and as a result, the load carrying device 50 is lifted, either rolling along the first cable 11, or lifting the first roller 53 and second roller 58 out of contact with the first and second cables 11, 13. When the winch 31 is rotated in a second direction, the first cable 11 is unwound from the winch 31 and as a result, the load carrying device 50 lowered on at path along the first and second cables 11, 13, while the first roller 53 remains in rollable contact with the first cable 11 and the second roller 58 remains in rollable contact with the second cable 13.

Figure 5B:
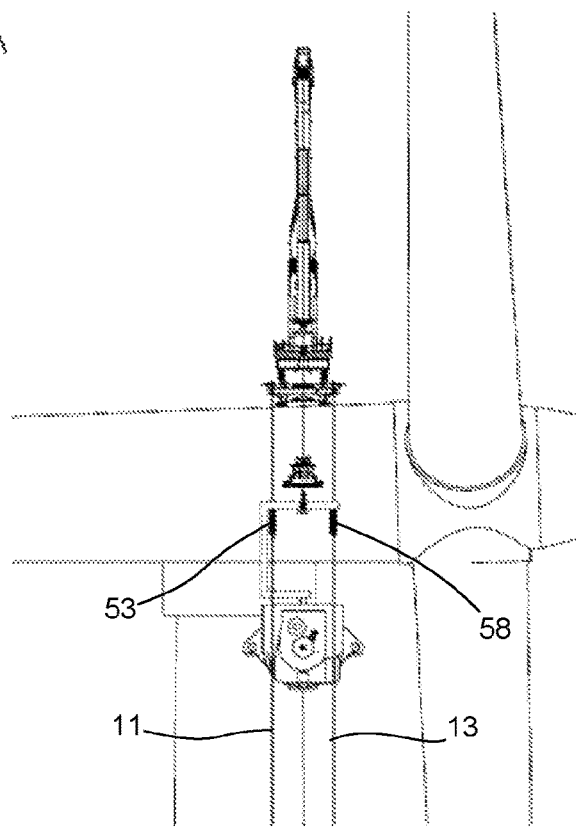

FIG. 5b show a side view of the FIG. 5a, and as it is seen here, the first roller 53 is position over the first cable 11 and the second roller 58 is positioned over the second cable 58.

Figure 6A:
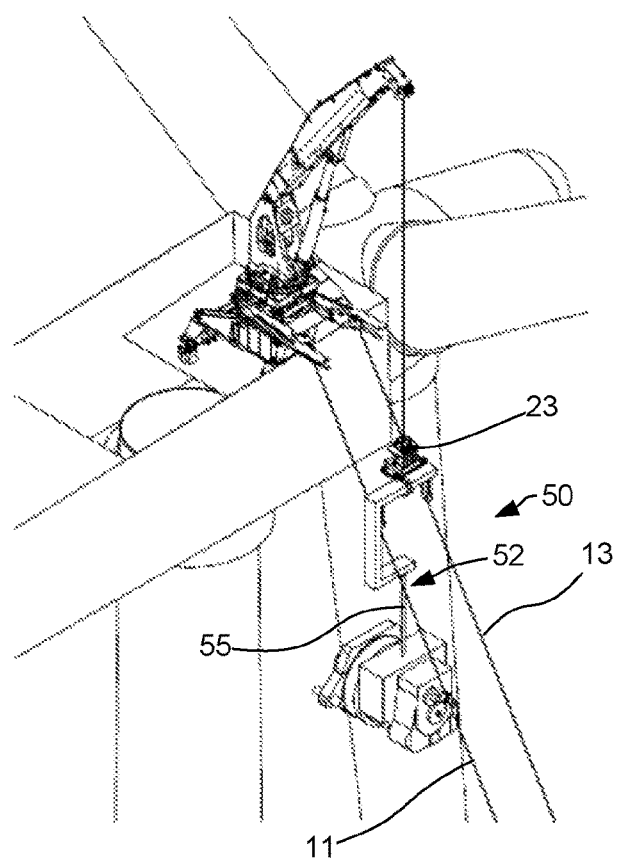
FIG. 6a shows a perspective view of a crane system with a load carrying device with an extended portion of a first linkage in accordance with the disclosure.

FIG. 6a show a perspective view of a crane system 50 according to an aspect of the disclosure, wherein the first linkage 52 comprises an extendable section 55, which can vary in length, such as a cylinder, a lead screw, a chain hoist or other suitable alternatives.

Figure 6B:
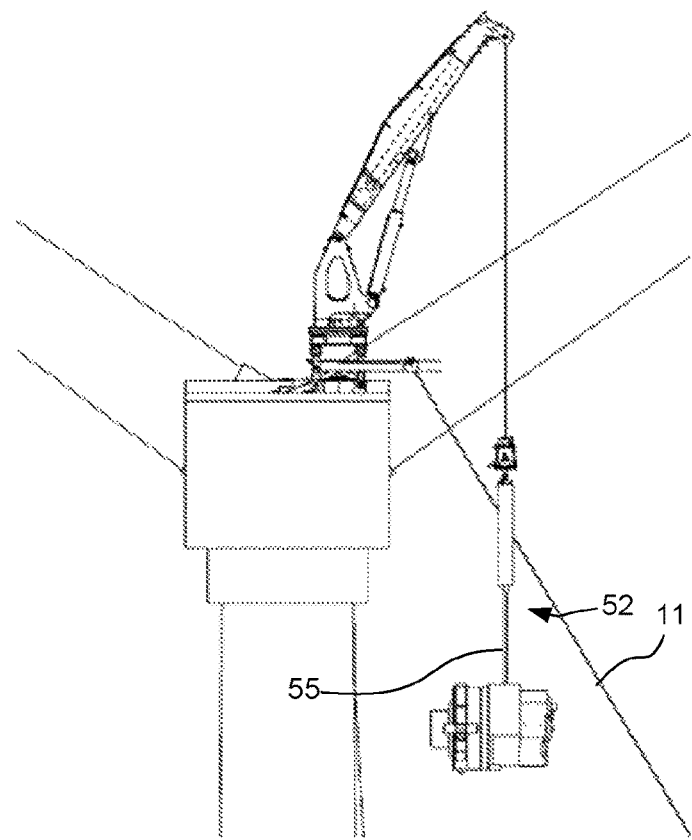

As seen on FIG. 6b, showing a side view of the FIG. 6a, when large volume components 4 are to be lifted, the extendable section 55 can be varied in length, such that the component 4 can be positioned further below the first roller 53, so as to avoid a collision between the component 4 and the first cable 11.

Figure 7:
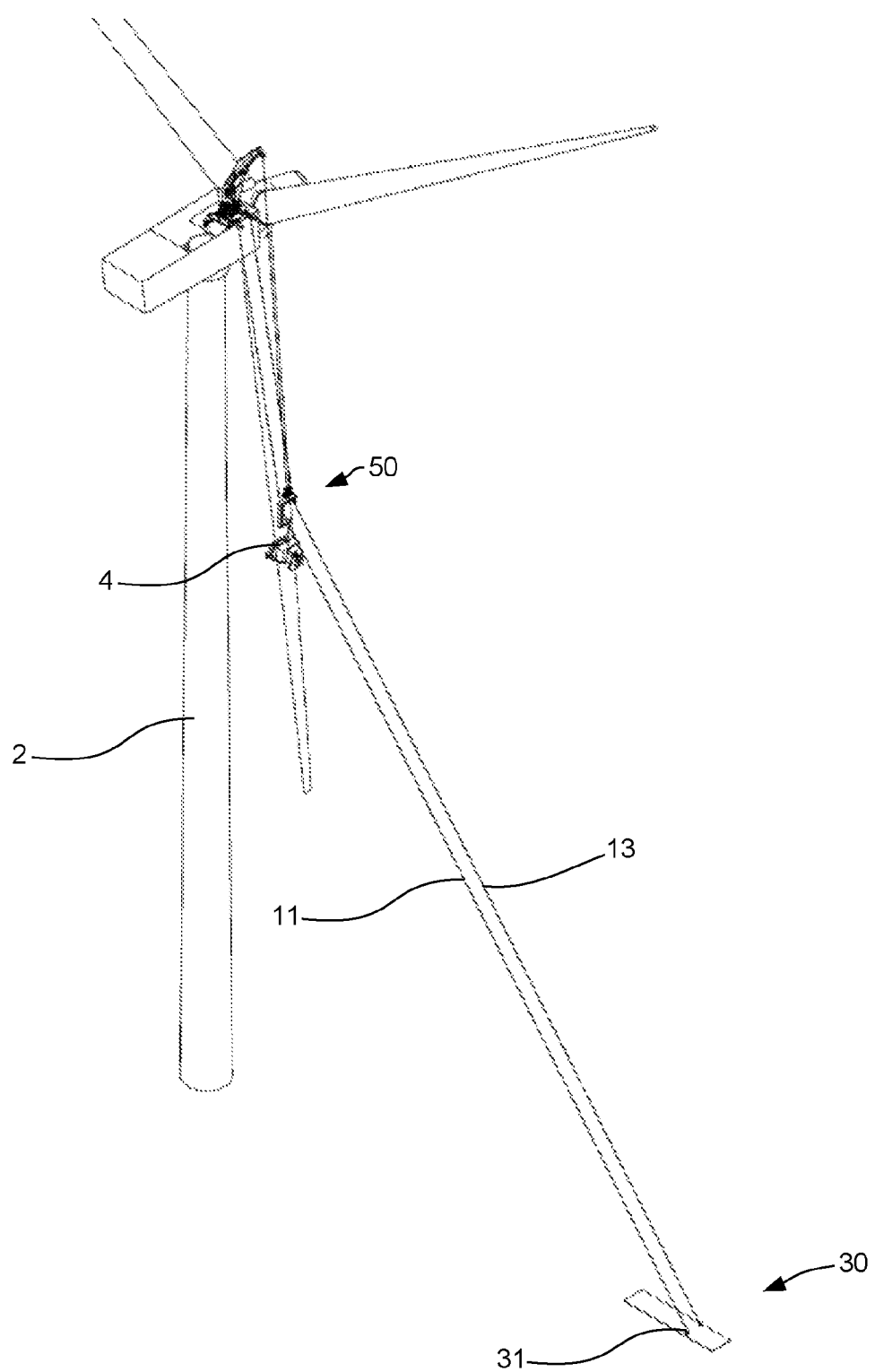
FIG. 7 shows a perspective view of a crane system moving a burden in accordance with the disclosure.
Figure 8:
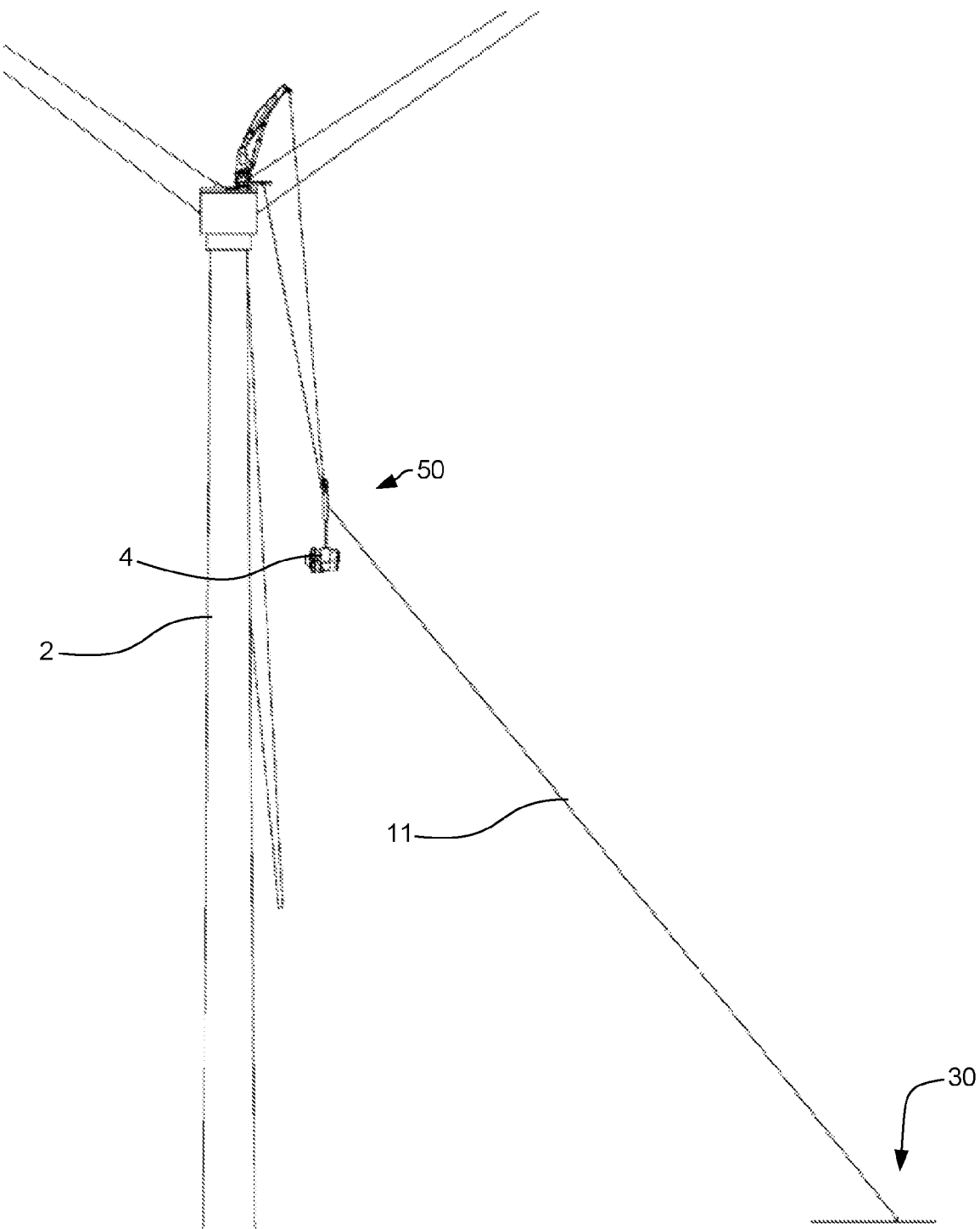
FIG. 8 shows a side view of FIG. 7.

FIGS. 7 and 8 show a perspective and side view respectively, when the first and second roller 53, 58 are in rollable contact with the first and second cable 11, 13, respectively, and the component 4 is in the process of being lowered towards the intended drop zone of the burden 4. Thus by rotating the winch 31 in the second direction, the first cable 11 is unwound from the winch 31 and as a result, the load carrying device 50 is lowered on at path along the first and second cables 11, 13, while the first roller 53 remains in rollable contact with the first cable 11 and the second roller 58 remains in rollable contact with the second cable 13.

Figure 9:
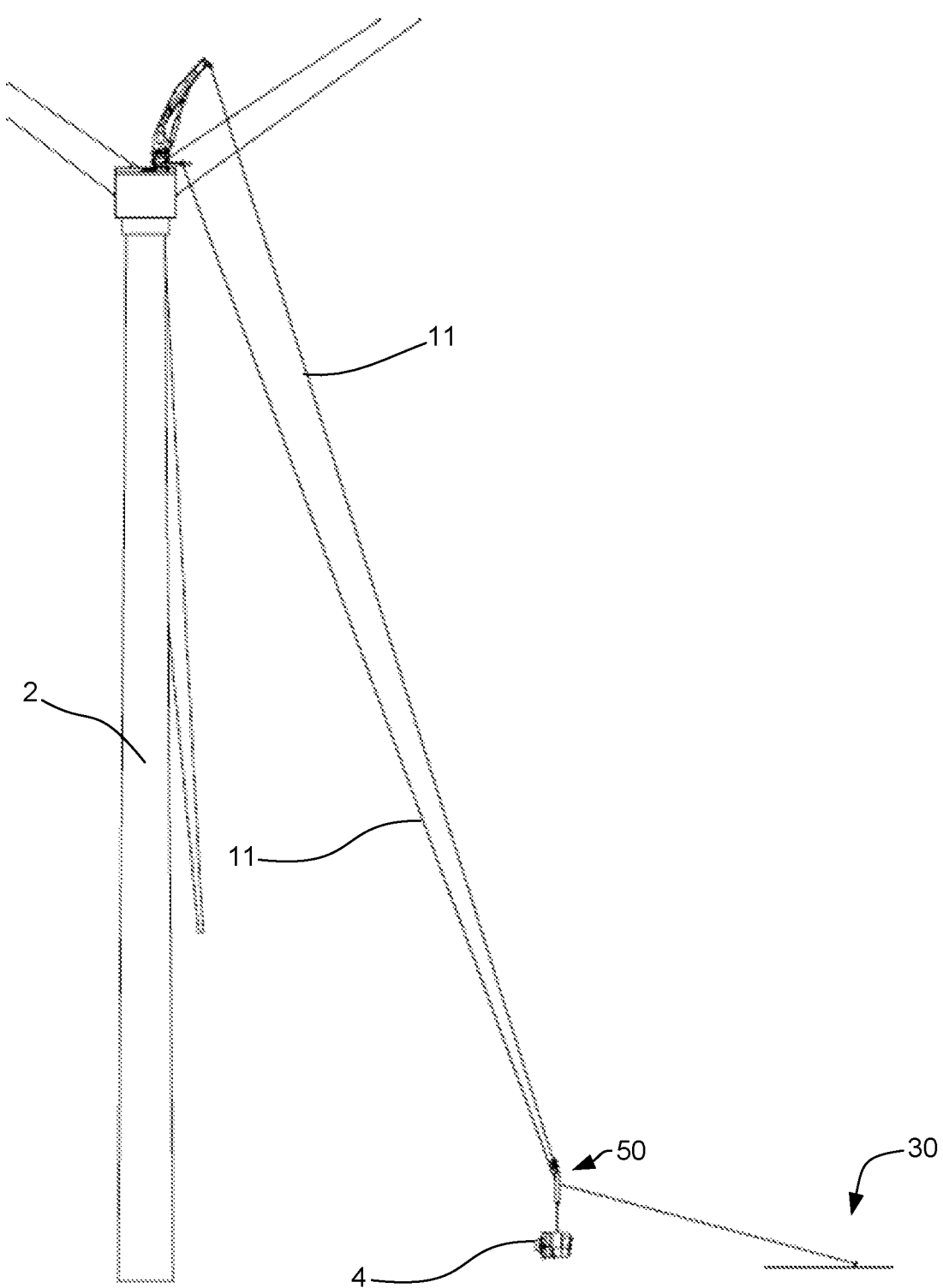
FIG. 9 shows a side view in accordance with the disclosure, where the burden is close to the ground.

FIG. 9 shows a side view of an example according to the disclosure, wherein the component 4 has been lowered to the intended drop zone at a location at a lower end of the wind turbine 1 at a distance from the wind turbine 1. The horizontal distance the burden 4 has been moved away from the wind turbine tower 2 is much larger than what it could have been moved if using a prior art crane system without a load carrying device 50 and at least a first cable 11 according to the inventive concept.

Figure 10:
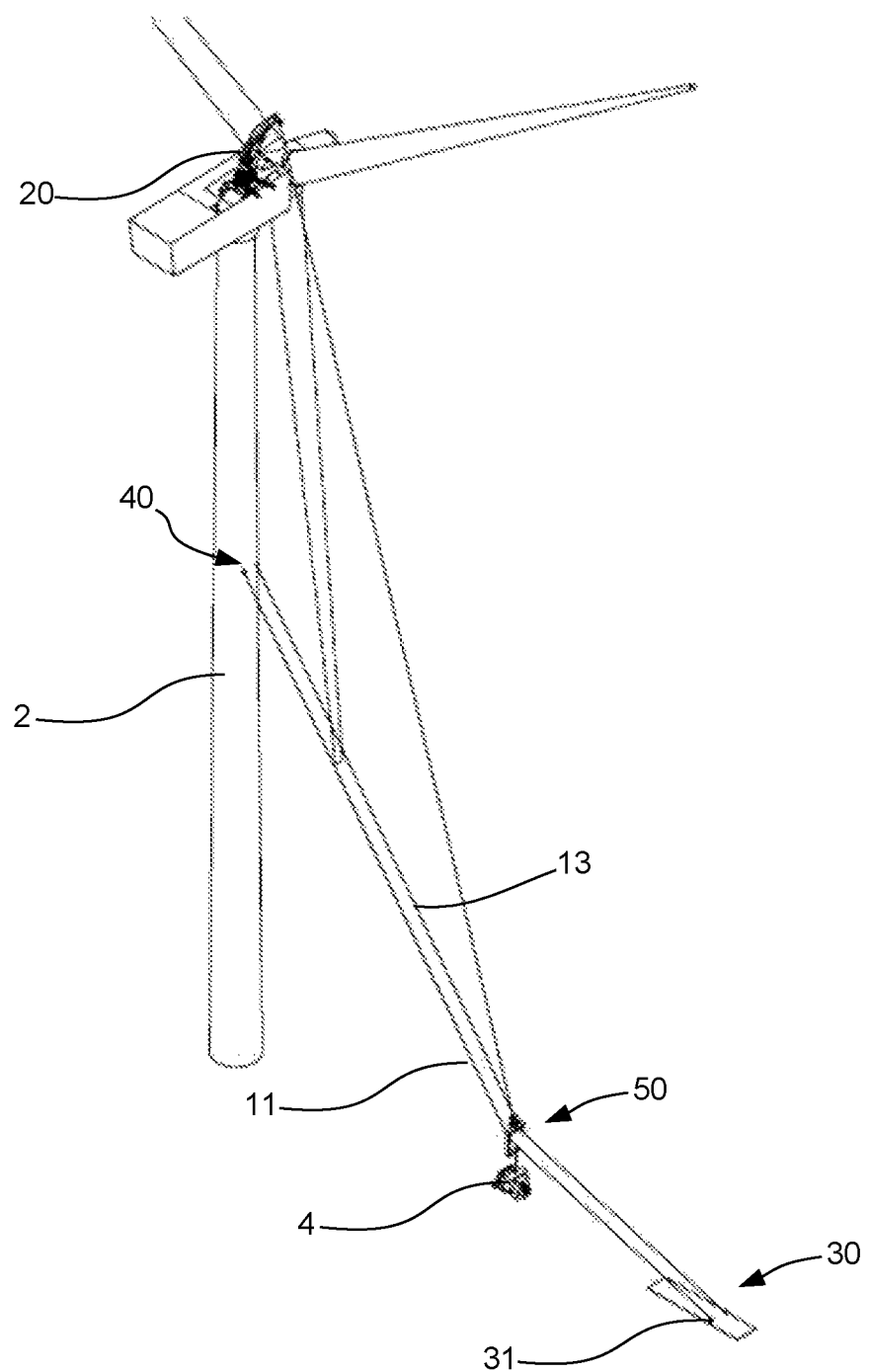
FIG. 10 shows a perspective view in accordance with the disclosure, wherein the upper cable support system is located on the wind turbine tower.

FIG. 10 shows a perspective view of an example according to the disclosure, wherein the upper cable support system 40 is attached to the wind turbine tower 2. In this example, the cable of the crane 20 is independent from both the first and second cable 11, 13, and as such can be operated independently of these. This is advantageous, as the tension in the first and second cables 11, 13 can be adjusted without operating the crane hook 23. In fact, the tension of the first cable 11 and the second cable 13 can be adjusted independently of each other. It can be advantageous to have different tensions in the first and second cables 11, 13, for example if trying to compensate for imbalance in the load carrying device 50.

Figure 11A:
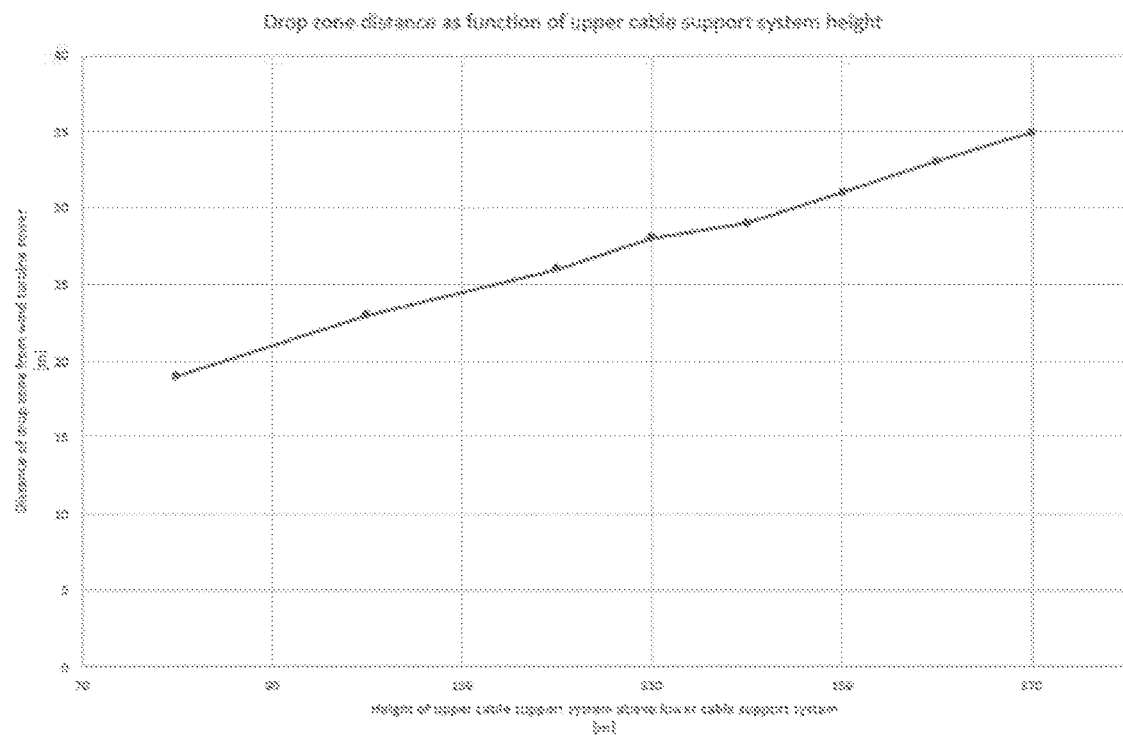
FIG. 11a shows a chart of intended drop zone distance from tower as function of upper cable support system height.
Figure 11B:
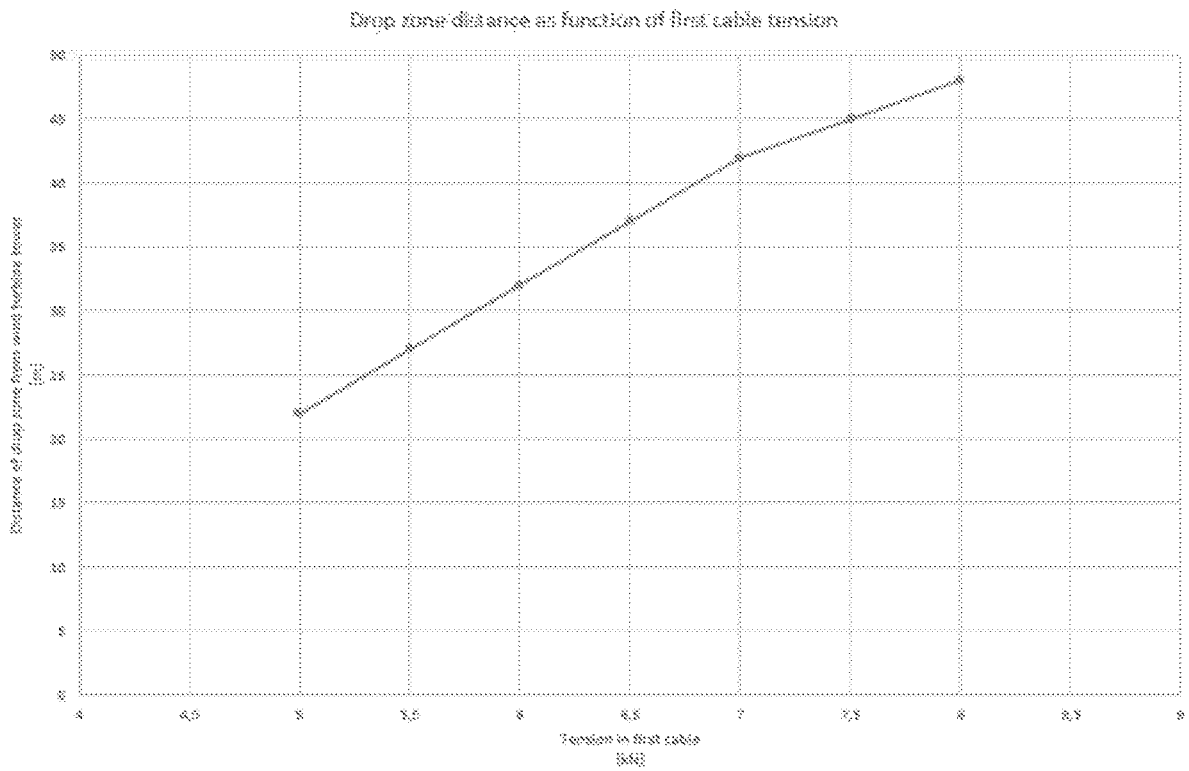
FIG. 11b shows a chart of intended drop zone distance from tower as function of first cable tension.

FIGS. 11a and 11b show charts of the expected drop zone distance from the wind turbine tower 2, when different variables are changed. As seen in FIG. 11a, the drop zone of the crane system 10 according to the inventive concept is moved further away from the wind turbine tower 2 as the height of the position of the upper cable support system 40 is increased and all other variables are held constant.

As seen in FIG. 11b, the drop zone of the crane system 10 according to the inventive concept is moved further away from the wind turbine tower 2 as the tension in the first and/or second cable 11, 13 is increased and all other variables are held constant.

In examples according to the disclosure where the first linkage 52 has an extendable section 55 and/or the second structural section has an extendable section 57, the location of the drop zone can further be affected by retracting or extending one or more extendable sections.

As such, much control over the location of the intended drop zone can be had, by changing a number of different variables.

Figure 12A:
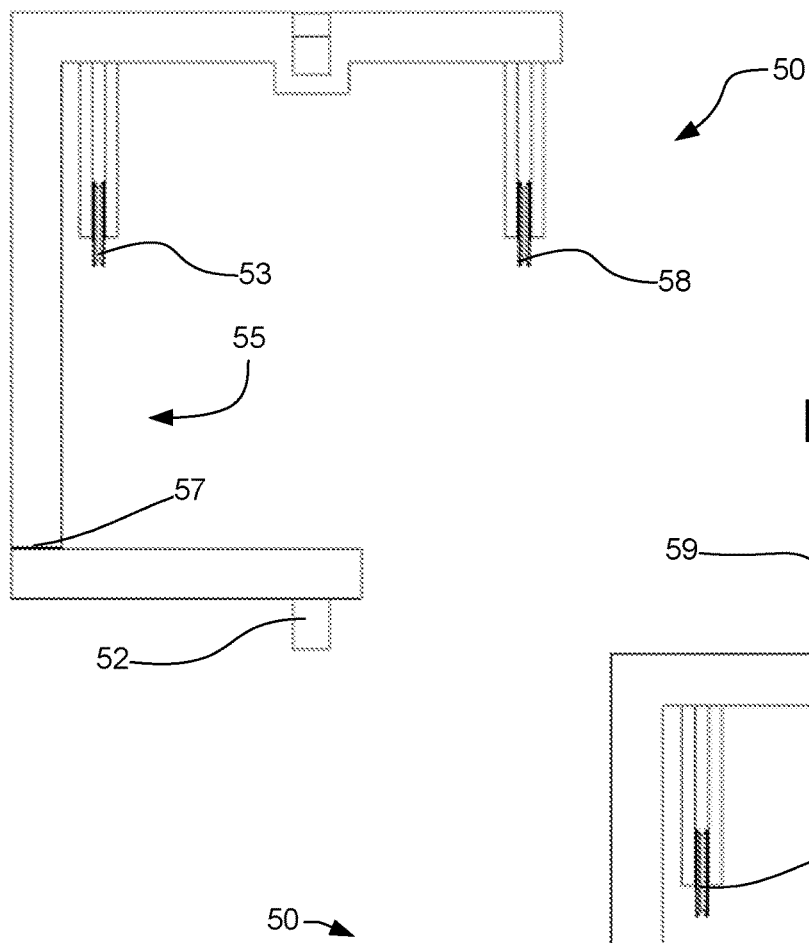
FIG. 12a shows a front view in accordance with the disclosure, wherein the second structural section is in its retracted configuration.

FIG. 12a shows a load carrying device 50 according to an example of the inventive concept, wherein the load carrying device 50 comprises a second structural section 55, said second structural section comprising an extendable section 57, which in FIG. 12a in retracted such that the section structural section 55 is in its retracted configuration.

Figure 12B:
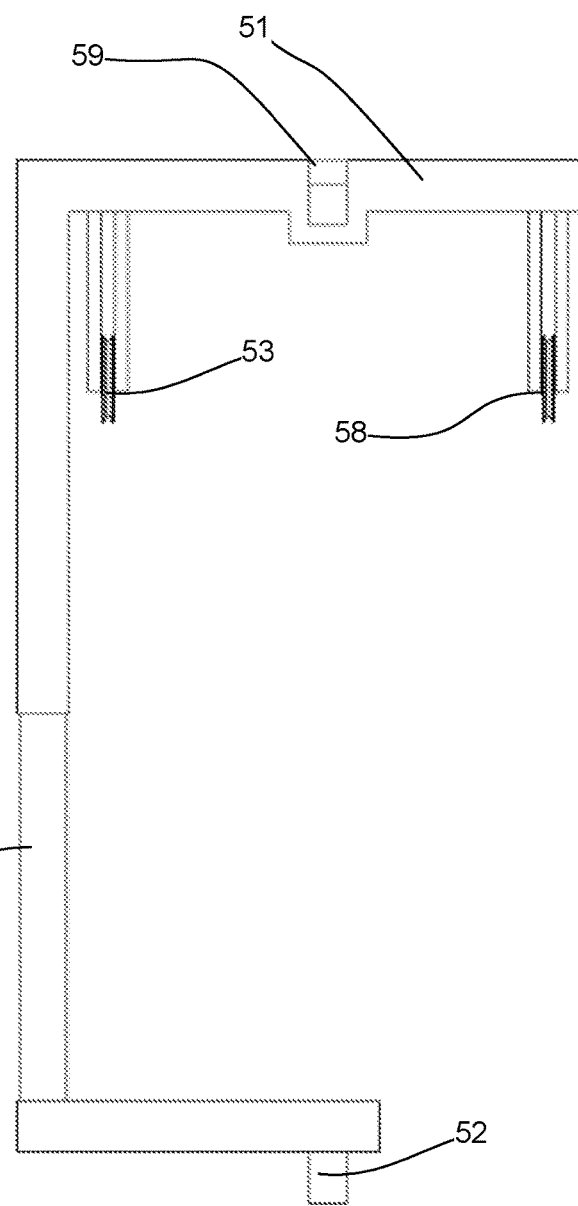
FIG. 12b shows another front view o in accordance with the disclosure, wherein the second structural section is in its extended configuration.

FIG. 12b shows a load carrying device 50 according to the example shown in FIG. 12a, wherein the extendable section 57 in FIG. 12b in extended such that the section structural section 55 is in its extended configuration. In a further example, the extendable section 57 can be held in any position between the position it is in the retracted configuration of the second structural section 55 and the position it is in the extended configuration of the second structural section 55.

The person skilled in the art realizes that the present disclosure by no means is limited to the preferred examples described above. On the contrary, many modifications and variations are possible within the scope of the appended claims.

What is claimed is:

1. A crane system for moving a burden between a location near a top of a wind turbine and a location at a lower end of the wind turbine at a distance from the wind turbine, wherein the crane system comprises:
   a crane configured to be mounted near or in a nacelle of the wind turbine and comprising a boom, wherein the crane has at least one rotational axis about which sections of the crane can rotate;
   a lower cable support system configured to be arranged at the lower end of the wind turbine at the distance from the wind turbine;
   an upper cable support system configured to be mounted on the wind turbine at a height higher than the lower cable support system;
   a first cable configured to be extended between the upper cable support system and the lower cable support system; and
   a load carrying device comprising:
      a first structural section, and
      a first linkage, wherein the first structural section comprises at least a first roller configured to roll on the first cable, and wherein the first linkage is configured to connect the load carrying device to the burden.

2. The crane system of claim 1, wherein the upper cable support system is located near or in the nacelle of the wind turbine.

3. The crane system of claim 1, wherein, when the first roller is engaged with the first cable, the first linkage is located below the first cable.

4. The crane system of claim 1, wherein the load carrying device has:
   a roller plane that is parallel to an axis of rotation of the first roller, intersects the first roller in at least one point, and is being perpendicular to a line extending between the first linkage and the axis of rotation of the first roller, wherein the line is perpendicular to the axis of rotation of the first roller, and wherein a center of mass of the load carrying device is located on a side of the roller plane that is towards the first linkage.

5. The crane system of claim 1, wherein the first linkage comprises an extendable section configured to vary in length.

6. The crane system of claim 1, wherein the load carrying device further comprises:
   a second structural section connecting the first structural section and the first linkage, wherein the second structural section comprises an extendable portion configured to vary in length.

7. The crane system of claim 1, further comprising:
   a tensioning device configured to adjust tension in the first cable.

8. The crane system of claim 7, wherein the lower cable support system comprises the tensioning device.

9. The crane system of claim 1, wherein:
   the first cable is connected to the crane at a first end of the first cable, and
   the upper cable support system is between the first end of the first cable and the lower cable support system.

10. The crane system of claim 1, further comprising:
   a second cable, wherein the first cable and the second cable are independently connected to the upper cable support system and the lower cable support system, and wherein the load carrying device comprises:

a second roller, wherein the first roller and the second roller are configured to roll on the first cable and the second cable respectively.

11. A method for moving a burden between a nacelle or a rotor of a wind turbine and a location at a lower end of the wind turbine at a distance from the wind turbine, the method comprising:
connecting a first cable between a lower cable support system that is configured to be arranged at the lower end of the wind turbine at the distance from the wind turbine and between an upper cable support system that is configured to be mounted on the wind turbine at a height higher than the lower cable support system;
connecting the burden to a load carrying device comprising a first structural section and a first linkage, wherein the burden is detachably attached to the first linkage and wherein the first structural section comprises a first roller;
lifting the burden using a crane mounted near or in the nacelle of the wind turbine;
placing the first structural section of the load carrying device on the first cable, wherein the first roller connects to the first cable in a rollable manner based on the placing; and
hoisting the burden up or down using the crane while the load carrying device is guided by the first cable.

12. The method of claim 11, further comprising:
yawing the crane about a substantially vertical axis and hoisting the burden between a position attached to the wind turbine inside the nacelle and a free position outside of the nacelle hanging from the first linkage.

13. The method of claim 11, further comprising:
connecting a second cable between the lower cable support system and the upper cable support system; and
placing the first structural section of the load carrying device on the first cable and the second cable, respectively, in the rollable manner.

14. The method of claim 11, further comprising:
extending an extendable portion of the first linkage, wherein the first linkage switches between a retracted configuration and an extended configuration based on the extending.

15. The method of claim 11, further comprising:
extending an extendable portion of a second structural section of the load carrying device, wherein the second structural section switches between a retracted configuration and an extended configuration based on the extending.

16. The crane system of claim 1, wherein a length of the first cable between the upper cable support system and the lower cable support system is parallel to a length of a second cable between the upper cable support system and the lower cable support system.

17. The crane system of claim 1, wherein the load carrying device comprises:
an attachment point that is one of a lifting eyelet, a shackle, or a bolt.

18. The crane system of claim 1, further comprising:
a secondary tensioning device located between the upper cable support system and the lower cable support system at a location near the upper cable support system, wherein the secondary tensioning device changes an angle and a position of the first cable by pulling the first cable towards a tower of the wind turbine when retracted.

19. The crane system of claim 1, wherein the burden is a wind turbine component, a transformer, or both.

20. The crane system of claim 5, wherein the first linkage is a cylinder, a lead screw, or a chain hoist.

* * * * *